United States Patent
Liao et al.

(10) Patent No.: US 10,239,243 B2
(45) Date of Patent: Mar. 26, 2019

(54) MICROBUBBLE CREATING METHOD USING A FORMING MACHINE

(71) Applicant: EVERFOCUS INTERNATIONAL CO., LTD., The Valley (AI)

(72) Inventors: Wei-Chih Liao, Changhua (TW); Cristina Chang, Changhua (TW)

(73) Assignee: Everfocus International Co., Ltd., The Valley (AI)

( * ) Notice: Subject to any disclaimer, the term of this patent is extended or adjusted under 35 U.S.C. 154(b) by 0 days.

(21) Appl. No.: 16/002,433

(22) Filed: Jun. 7, 2018

(65) Prior Publication Data

US 2018/0281248 A1 Oct. 4, 2018

Related U.S. Application Data

(62) Division of application No. 14/872,858, filed on Oct. 1, 2015.

(51) Int. Cl.
| | |
|---|---|
| *B29C 45/17* | (2006.01) |
| *B29K 105/00* | (2006.01) |
| *B29C 44/34* | (2006.01) |
| *B29K 105/04* | (2006.01) |

(52) U.S. Cl.
CPC ...... *B29C 45/1703* (2013.01); *B29C 44/3442* (2013.01); *B29K 2105/0055* (2013.01); *B29K 2105/0058* (2013.01); *B29K 2105/041* (2013.01)

(58) Field of Classification Search
CPC ................................. B29C 45/1703
See application file for complete search history.

(56) References Cited

U.S. PATENT DOCUMENTS

| | | |
|---|---|---|
| 7,264,757 B2 | 9/2007 | Chang et al. |
| 2005/0189667 A1* | 9/2005 | Chang ............ B29C 44/3446 264/4 |

* cited by examiner

*Primary Examiner* — Larry W Thrower
(74) *Attorney, Agent, or Firm* — Muncy, Geissler, Olds & Lowe, P.C.

(57) ABSTRACT

A microbubble creating method using a forming machine for creating microbubbles by: installed a microbubble generating member in a mold, feed screw or barrel for enabling a perforated tip of the microbubble generating member to be surrounded by the applied fluid polymer so that when a high pressure high temperature gas is delivered through the perforated tip of the microbubble generating member, microbubbles are created with well mixed with the fluid polymer, and the expected foamed polymer product is thus obtained after cooling.

6 Claims, 8 Drawing Sheets

MICROBUBBLE CREATING METHOD USING A FORMING MACHINE

CROSS-REFERENCE TO RELATED APPLICATION

This application is a divisional of application Ser. No. 14/872,858, filed on Oct. 1, 2015.

BACKGROUND OF THE INVENTION

1. Field of the Invention

The present invention relates to foaming technology and more particularly, to a microbubble creating method for creating microbubbles in fluid polymer using a forming machine.

2. Description of the Related Art

Foam manufacturing technologies can be classified as mechanical foaming, physical foaming and chemical foaming. In the mechanical foaming, bubbles are created by using an agitator to stir a gas into the fluid polymer. In the physical foaming, heat produces a low boiling liquid which evaporates, thus forming the bubbles. In the chemical foaming, the blowing agent reacts under the influence of heat, releasing gases, which forms the voids in the fluid polymer beads obtained through the suspension polymerization.

Further, U.S. Pat. No. 7,264,757 discloses a different technique in which a gas delivery pipe is embedded in a feed screw, and a plurality of microporous breathable blocks is mounted at the front end of the feed screw. When a high pressure gas is delivered into the gas delivery pipe, the high pressure gas is heated in an indirect manner and then guided through the micro holes of the microporous breathable blocks into the fluid polymer, and thus, the high pressure gas is mixed with the fluid polymer subject to rotation of the feed screw, and then the mixture of the high pressure gas and the fluid polymer is filled into a mold, causing creating of microbubbles in the fluid polymer.

In the aforesaid prior art structures, the microporous breathable blocks are embedded in air vents in the feed screw in flush with the surface of the feed screw, thus, the microporous breathable blocks can only be kept in contact with the surface of the fluid polymer and will not be surrounded by the polymer, thus, the supplied gas cannot be fully mixed with the fluid polymer, resulting in uneven distribution of generated microbubbles in the fluid polymer.

SUMMARY OF THE INVENTION

The present invention has been accomplished under the circumstances in view. It is the main object of the present invention to provide a microbubble creating method for creating microbubbles in a polymer using a forming machine, which enhances mixing between the applied gas and fluid polymer, improving uniformity of microbubbles in the fluid polymer.

To achieve this and other objects of the present invention, a microbubble creating method in accordance with a first embodiment of the invention has a microbubble generating member installed in a mold. The method is to drive a feed screw in propelling a fluid polymer into the mold, enabling the perforated tip of the microbubble generating member to be surrounded by the fluid polymer; and then to start up a microbubble generator in generating a high pressure high temperature gas, enabling the high pressure high temperature gas to create microbubbles for mixing with the fluid polymer in the mold when passed through the perforated tip of the microbubble generating member, and thus, the expected foamed polymer product with smooth surface and foamed subcoat is obtained after cooling.

In a second embodiment of the invention, the microbubble generating member is installed in a holder member that defines a runner in communication between the feed screw and a mold. The method is to drive the feed screw in propelling the fluid polymer, enabling the fluid polymer to flow through the runner of the holder member and to surround the perforated tip of the microbubble generating member in the runner of the holder member. Thereafter, start up the microbubble generator to generate the desired high pressure high temperature gas, enabling high pressure high temperature gas to create microbubbles after passed through the perforated tip of the microbubble generating member. The created microbubbles are then mixed with the fluid polymer in the runner, and thus, the expected foamed polymer product with smooth surface and foamed subcoat is obtained after cooling.

In a third embodiment of the invention, a microbubble generating member is installed in a locating ring that is mounted at the front end of the feed screw. This method is to drive the feed screw in propelling the fluid polymer that surrounds the perforated tip of the microbubble generating member during flowing. Thereafter, start up the microbubble generator to inject a high pressure gas into an air passage of the feed screw, enabling the high pressure gas to be heated when it is flowing through the air passage. After heating, the high pressure gas goes through the air passage of the feed screw into the microbubble generating member. After the high pressure gas passed through the perforated tip of the microbubble generating member, microbubbles are created and mixed with the fluid polymer subject to rotation of the feed screw.

In a fourth embodiment of the invention, a microbubble generating member is installed in an output end of a barrel, and a fluid delivery device is installed in an opposing input end of the barrel. The method is to drive the feed screw is propelling a fluid polymer from the input end of the barrel toward the output end thereof. During propelling, the fluid polymer is heated, and the perforated tip of the microbubble generating member is surrounded by the flowing fluid polymer. At this time, the fluid delivery device is controlled to inject a foaming fluid into the barrel, enabling the foaming fluid to be mixed with the fluid polymer and heated. Thereafter, start up the microbubble generator to fill a high pressure gas into an air passage in the barrel, enabling the supplied high pressure gas to be heated in the air passage. After heating, the high pressure gas goes through the air passage of the barrel into the microbubble generating member. After the high pressure gas passed through the perforated tip of the microbubble generating member, microbubbles are created and mixed with the fluid polymer subject to rotation of the feed screw. Further, the foaming fluid is heated and gradually vaporized during flowing, creating microbubbles in the fluid polymer, and achieving production of well foamed polymer product.

Other advantages and features of the present invention will be fully understood by reference to the following specification in conjunction with the accompanying drawings, in which like reference signs denote like components of structure.

DETAILED DESCRIPTION OF THE INVENTION

Figure 2:
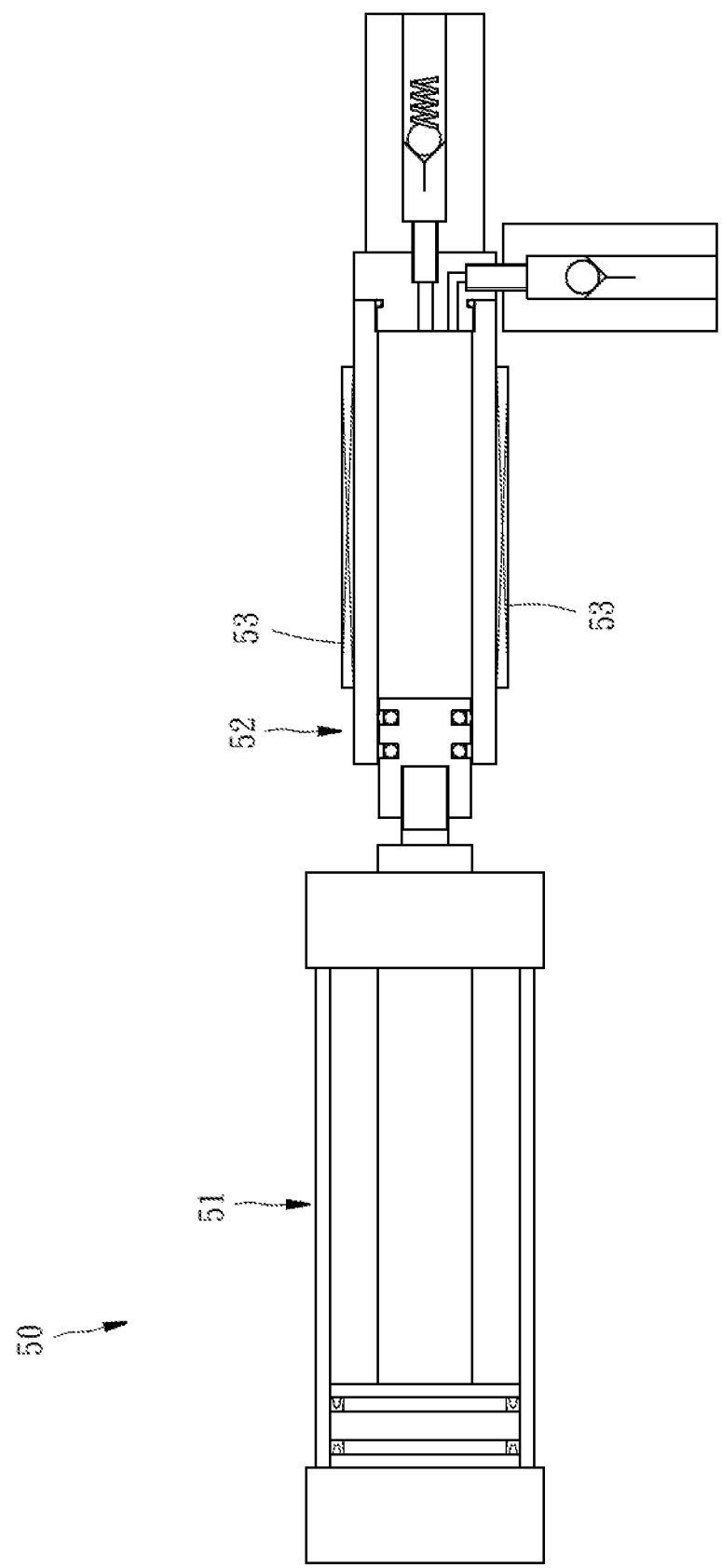
FIG. 2 is a plain view of a microbubble generator in accordance with the first embodiment of the present invention.
Figure 6:
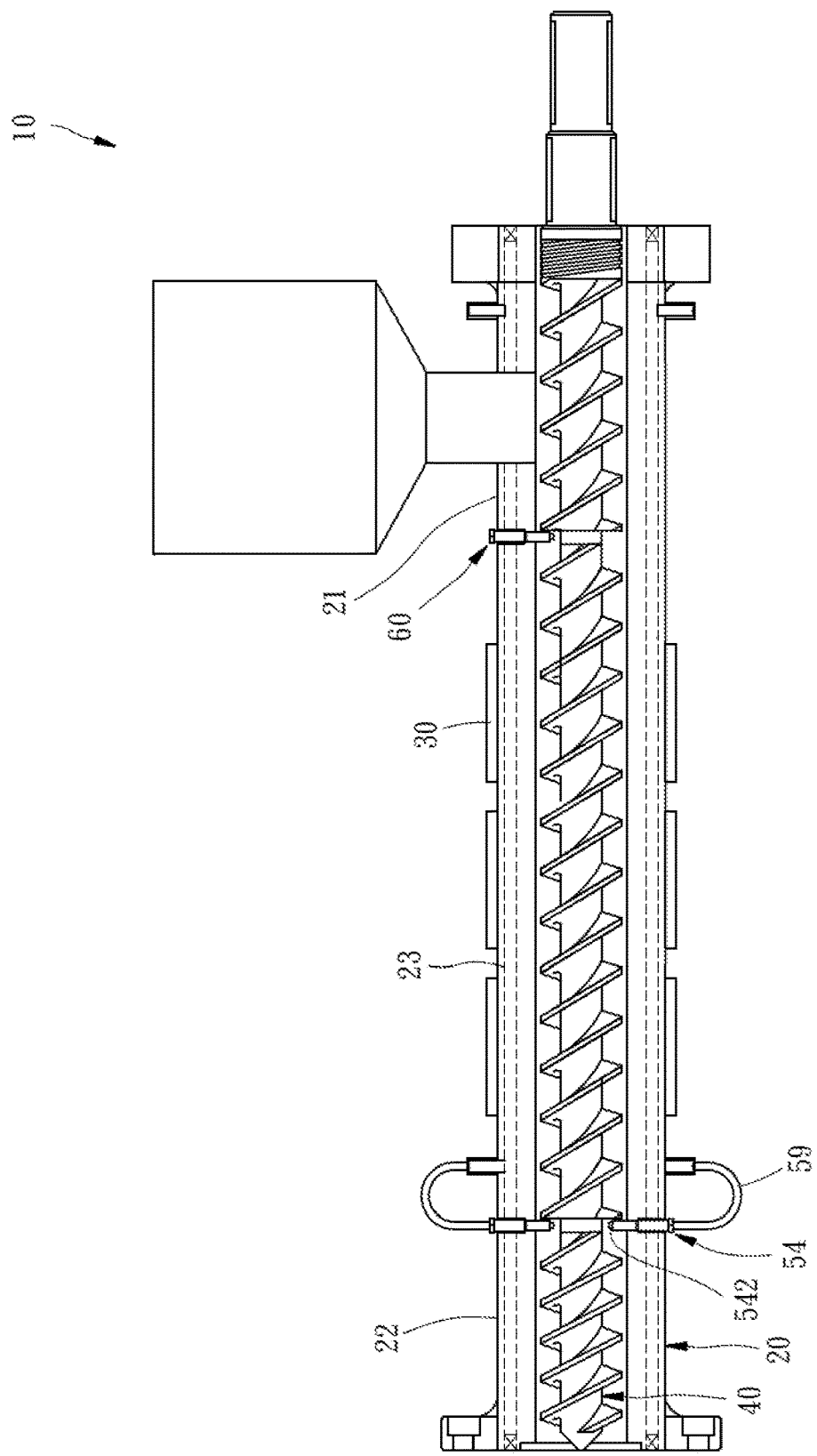
FIG. 6 is a schematic structural view of a fourth embodiment of the present invention.

Referring to FIG. 6, a microbubble creating method in accordance with a first embodiment of the invention is to be implemented using a foaming machine 10. The forming machine 10 in this first embodiment of the present invention is an extrusion molding machine, comprising a barrel 20, a heater 30 mounted around the periphery of the barrel 20 for melting a solid polymer into a fluid polymer 12, a feed screw 40 mounted in the barrel 20 for propelling the fluid polymer 12 toward a mold 14. As illustrated in FIG. 2, the forming machine 10 further comprises a microbubble generator 50. The microbubble generator 50 can be an air compressor or any other equivalent air compression device. In this embodiment, the microbubble generator 50 comprises a pressure cylinder 51, a accumulator 52, a plurality of electric heating components 53, and a plurality of microbubble generating members 54. The pressure cylinder 51 is adapted for increasing the pressure of air being filled from the outside. The accumulator 52 is connected to the pressure cylinder 51 for storing compressed air. The electric heating components 53 are mounted around the periphery of the accumulator 52 for heating compressed air in the accumulator 52. The microbubble generating members 54 are connected to the accumulator 52 for outputting high pressure high temperature gas into the accumulator 52. Further, each microbubble generating member 54 comprises a perforated tip 542 made from, but not limited to, metal, ceramics, or a composite of metal and ceramics. In this first embodiment, the microbubble generating members 54 are mounted in an input end 16 of the mold 14 with the perforated tip 542 thereof extended into the mold 14.

Figure 1:
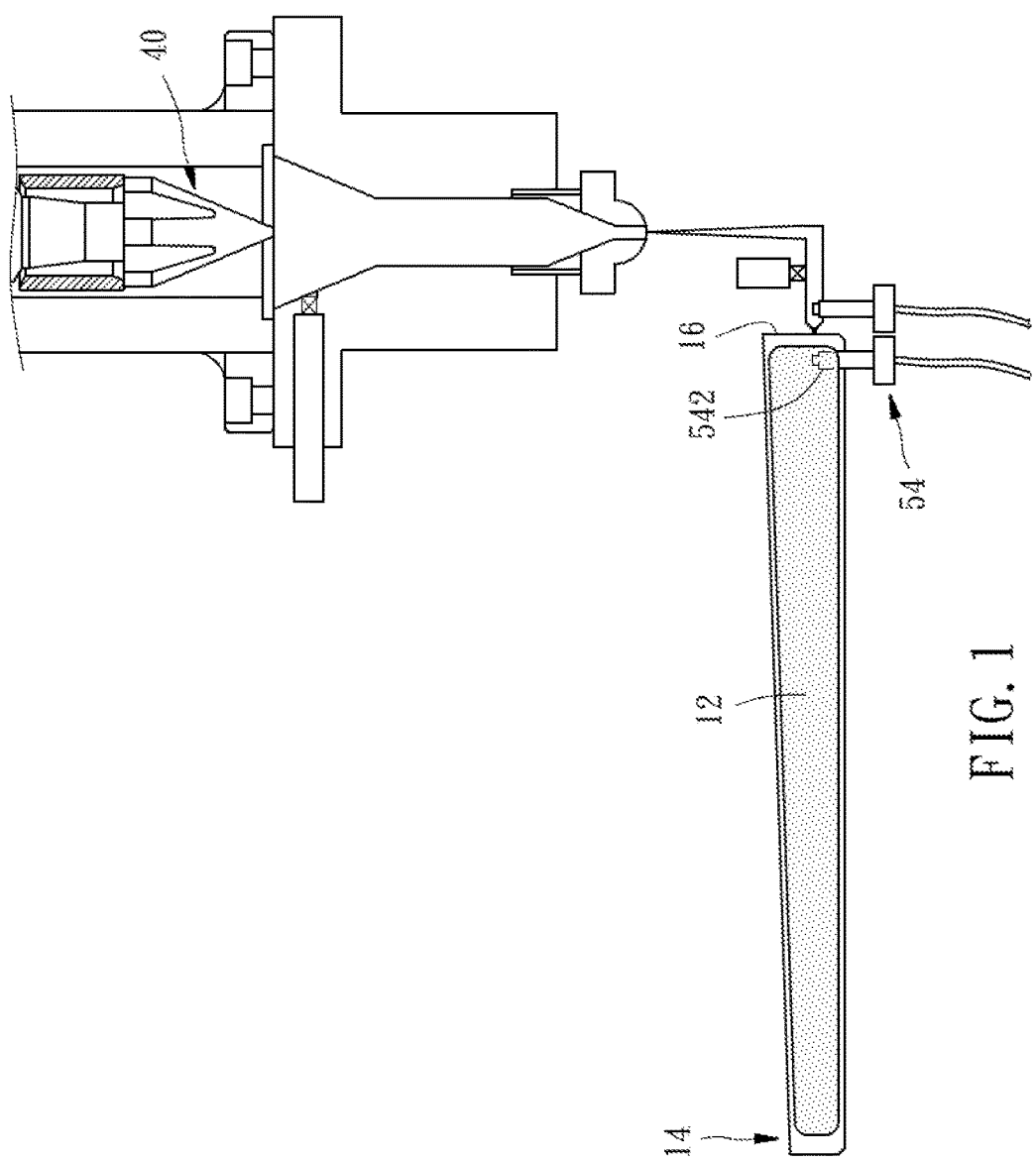
FIG. 1 is a schematic drawing illustrating the flow of a microbubble creating method in accordance with a first embodiment of the present invention.

Referring also to FIG. 1, the microbubble creating method in accordance with the first embodiment of the invention comprises the steps of:

Step a): Drive the feed screw 40 to propel the fluid polymer 12 into the inside of the mold 14, enabling the perforated tips 542 of the microbubble generating members 54 to be immersed in the fluid polymer and is surrounded by the fluid polymer 12 in the mold 14.

Step b): Start up the microbubble generator 50 to generate high pressure high temperature gas, forcing high pressure high temperature gas to go out of the perforated tips 542 of the microbubble generating members 54 and to further create microbubbles that are then mixed in the fluid polymer 12 inside the mold 14. After cooling, the expected foamed polymer product with smooth surface and foamed subcoat is thus obtained.

Figure 3:
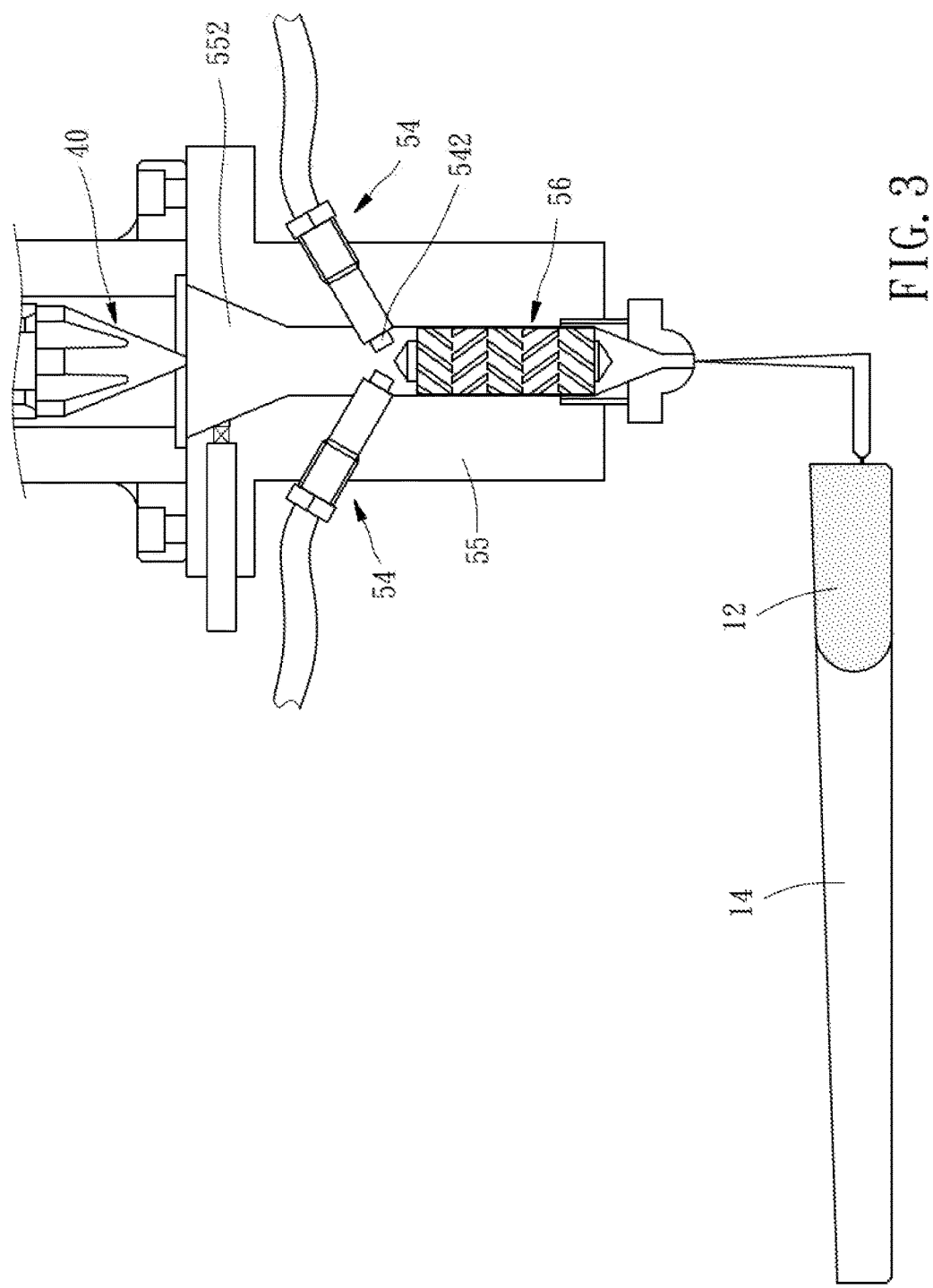
FIG. 3 is a schematic drawing illustrating the flow of a microbubble creating method in accordance with a second embodiment of the present invention.

Referring to FIG. 3, a microbubble creating method in accordance with a second embodiment of the invention can be implemented using an extrusion molding or injection molding machine. This second embodiment is substantially similar to the aforesaid first embodiment with the exception that each microbubble generating member 54 is obliquely mounted at a holder member 55 that defines a runner 552 in communication between the feed screw 40 and the mold 14 for enabling a fluid polymer 12 to pass; each microbubble generating member 54 comprises a perforated tip 542 with extended into the runner 552 so that microbubbles generated by each microbubble generating member 54 can be filled into the fluid polymer 12 at a low pressure; the microbubble generator 50 further comprises a static mixer 56 mounted in the runner 552 of the holder member 55 between the microbubble generating member 54 and the mold 14 for enabling generated microbubbles to be well mixed with the fluid polymer 12. Thus, the microbubble creating method in accordance with this second embodiment of the invention comprises the steps of:

Step a): Drive the feed screw 40 to propel the feeding fluid polymer 12. When the fluid polymer 12 is being propelled into the runner 552 of the holder member 55, the perforated tips 542 of the microbubble generating members 54 will be to be immersed in the fluid polymer and surround the fluid polymer 12 and be propelled through the runner 552 of the holder member 55 into the mold 14.

Step b): Start up the microbubble generator 50 to generate high pressure high temperature gas forcing high pressure high temperature gas to go out of the perforated tips 542 of the microbubble generating members 54 and to further create microbubbles that are then mixed in the fluid polymer 12 in the runner 552 subject to the functioning of the static mixer 56, and then delivered with the fluid polymer 12 toward the inside the mold 14. After cooling, the expected foamed polymer product with smooth surface and foamed subcoat is thus obtained.

Figure 4:
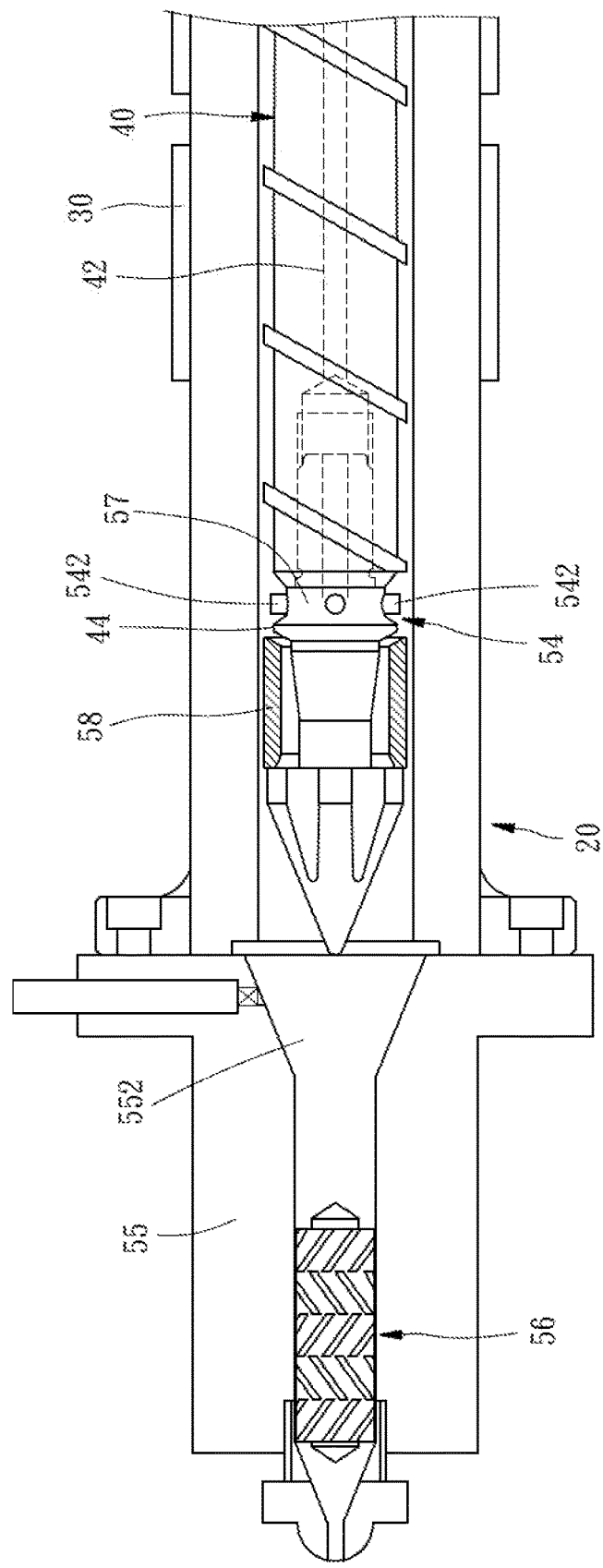
FIG. 4 is a schematic drawing illustrating a check ring stopped at a stop flange of a feed screw in accordance with a third embodiment of the present invention.

Referring to FIG. 4, a microbubble creating method in accordance with a third embodiment of the invention can be implemented using an injection molding machine. This third embodiment is substantially similar to the aforesaid first and second embodiments with the exception that each microbubble generating member 54 is mounted in a locating ring 57 that is mounted at a front end of the feed screw 40 in such a manner that the perforated tip 542 of each microbubble generating member 54 protrudes over the surface of the feed screw 40; the microbubble generator 50 further comprises an air compressor (not shown) adapted for providing high pressure gas to each microbubble generating member 54; a static mixer 56 is disposed at a front side relative to the feed screw 40. Thus, the microbubble creating method in accordance with this third embodiment of the invention comprises the steps of:

Step a): Drive the feed screw 40 to propel the fluid polymer 12, enabling the fluid polymer 12 to surround the perforated tips 542 of the microbubble generating members 54 during delivery.

Step b): Start up the air compressor of the microbubble generator 50 to provide high pressure gas into an air passage 42 in the feed screw 40, enabling high pressure gas to be heated by the heater 30 when flowing through the air passage 42.

Step c): After heating, high pressure gas goes through the air passage 42 of the feed screw 40 into the microbubble generating members 54 to create microbubbles after passed through the perforated tips 542 of the microbubble generating members 54, enabling created microbubbles to be primarily mixed with the fluid polymer 12 subject to rotation of the feed screw 40 and then the static mixer 56 will mix the microbubbles with the fluid polymer 12 when injection again.

Figure 5:
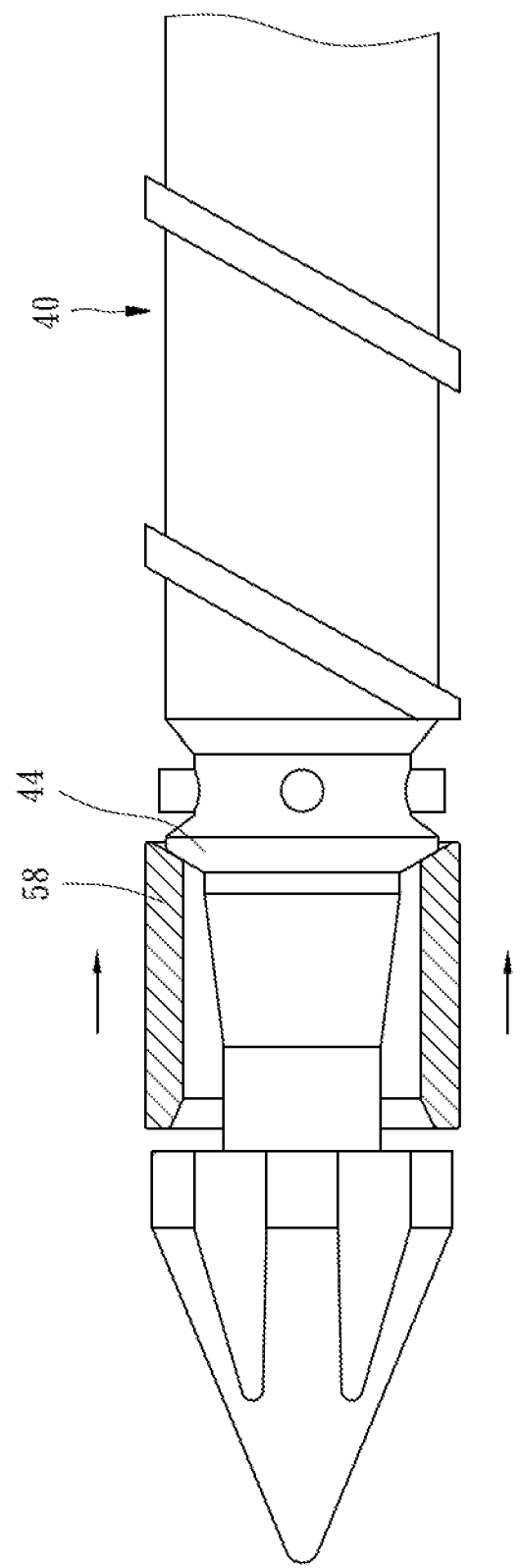
FIG. 5 corresponds to FIG. 4, illustrating the check ring moved away from the stop flange of the feed screw.

Further, the feed screw 40 comprises a stop flange 44 disposed near a front end thereof and abutted against the locating ring 57. Further, a check ring 58 is attached to the front end of the feed screw 40, as shown in FIG. 5. When the feed screw 40 is being rotated to propel the feeding material, the check ring 58 will be forced to move away from the stop flange 44 of the feed screw 40, enabling the barrel 20 to accommodate sufficient high pressure high temperature gas and sufficient volume of the fluid polymer 12. When injecting the fluid polymer 12 into the mold 14, the check ring 58 will be stopped at the stop flange 44 of the feed screw 40 to prevent a reverse flow of the fluid polymer 12, avoiding clogging of the perforated tips 542 of the microbubble generating members 54 by micromolecules of the fluid polymer 12.

Referring to FIG. 6, a microbubble creating method in accordance with a fourth embodiment of the invention can be implemented using an extrusion molding machine. This fourth embodiment is substantially similar to the aforesaid first embodiment with the exception that the microbubble generating members 54 are mounted in the output end 22 of the barrel 20 with the perforated tips 542 of the microbubble generating members 54 extended inside into the barrel 20; further, the microbubble generating members 54 are connected to an air compressor (not shown), constituting the microbubble generator 50. Thus, the microbubble creating method in accordance with this fourth embodiment of the invention comprises the steps of:

Step a): Drive the feed screw 40 to propel the fluid polymer 12, enabling the fluid polymer 12 to be heated by the heater 30 and the perforated tips 542 of the microbubble generating members 54 immerse in the fluid polymer and to be surrounded by the fluid polymer 12 as the fluid polymer 12 is being propelled from the input end 21 of the barrel 20 toward the output end 22 of the barrel 20.

Step b): Start up the microbubble generator 50 to provide high pressure gas into an air passage 23 in the barrel 20, enabling high pressure gas to be heated by the heater 30 when flowing through the air passage 23.

Step c): After heating, high pressure gas goes from the air passage 23 of the barrel 20 through a pipeline 59 into the microbubble generating members 54 to create microbubbles after passed through the perforated tips 542 of the microbubble generating members 54, enabling created microbubbles to be mixed with the fluid polymer 12 during rotation of the feed screw 40.

The microbubble generator 50 further comprises a fluid delivery device 60 mounted in the input end 21 of the barrel 20 and extend inside into the barrel 20. Thus, in the aforesaid Step a), the fluid delivery device 60 is controlled to inject a foaming fluid into the barrel 20, enabling the supplied foaming fluid to be mixed with the fluid polymer 12 and heated by the heater 30. When the foaming fluid is vaporized, microbubbles are created in the fluid polymer 12 to mate with the microbubbles generated by the microbubble generating members 54, achieving production that is well foamed polymer product.

Figure 7:
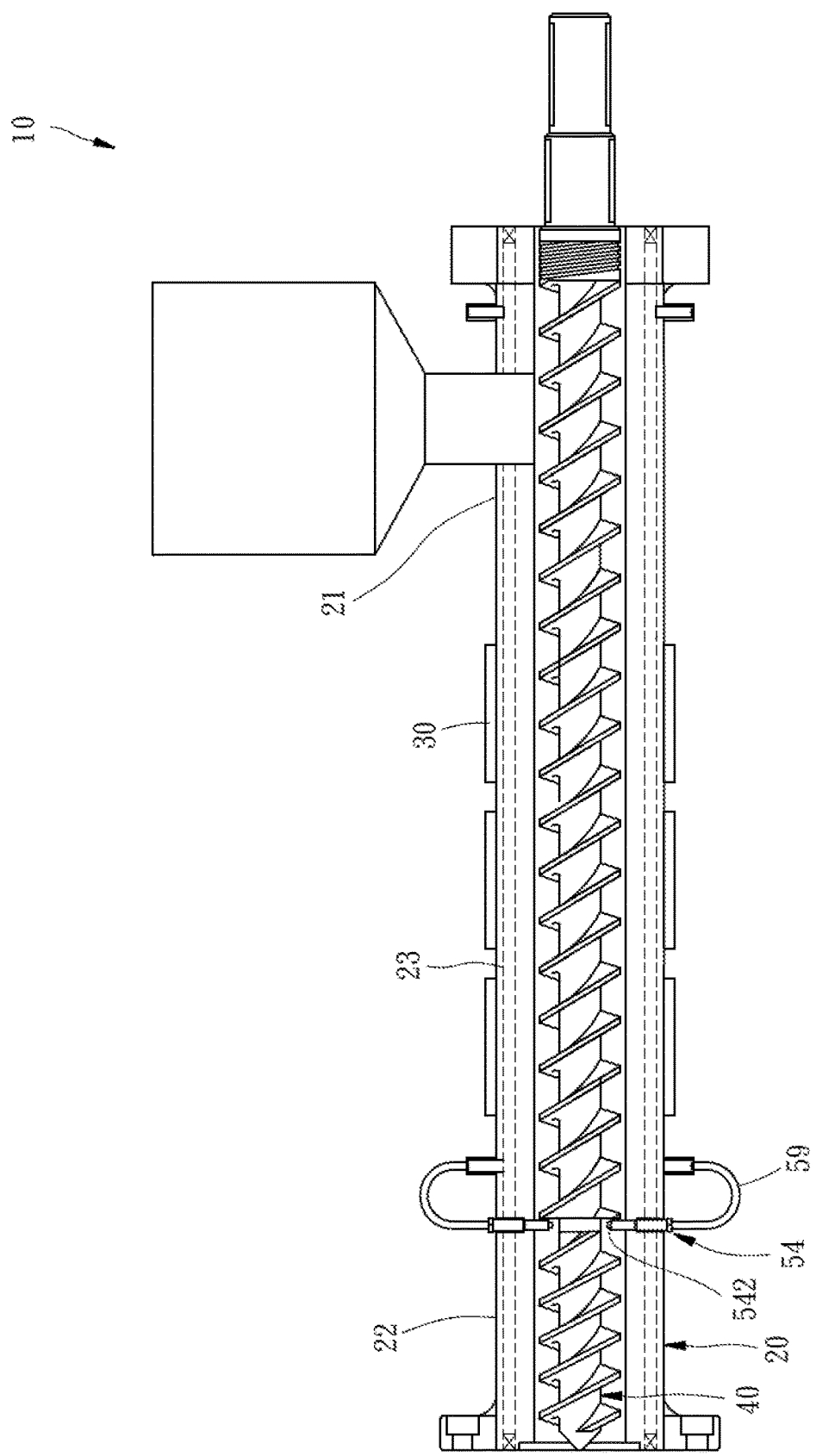
FIG. 7 is a schematic structural view of a fifth embodiment of the present invention.
Figure 8:
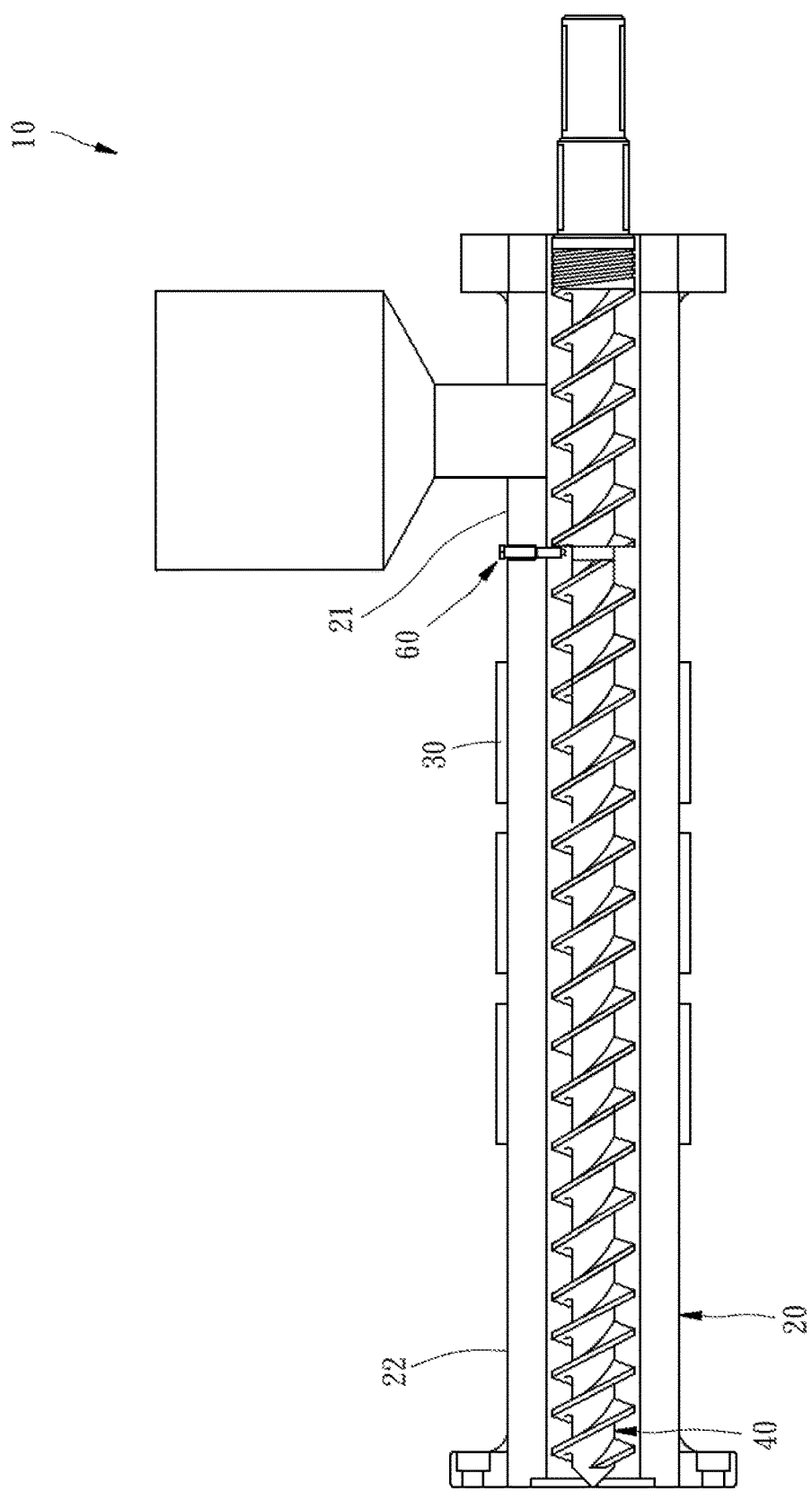
FIG. 8 is a schematic structural view of a sixth embodiment of the present invention.

It is to be noted that, as shown in FIG. 7 and FIG. 8, it is not imperative to have the microbubble generating members 54 and the fluid delivery device 60 be concomitantly installed. In actual application, the microbubble generating members 54 and the fluid delivery device 60 can be selectively installed. For example, in the application example shown in FIG. 6, the microbubble generating members 54 and the fluid delivery device 60 are concomitantly installed; in the application example shown in FIG. 7, only the microbubble generating members 54 are installed; in the application example shown in FIG. 8, the fluid delivery device 60 is installed, and the aforesaid microbubble generating members 54 are eliminated. In any application example, sufficient microbubbles can be created to achieve excellent foaming. Of course, both the microbubble generating members 54 and the fluid delivery device 60 can be concomitantly installed to achieve optimal effects.

In conclusion, the microbubble creating method of the invention is to insert microbubble generating members 54 into the applied fluid polymer 12. When compared to conventional techniques, the invention significantly increases the contact area between the microbubble generating members 54 and the fluid polymer 12, thereby increasing the amount of gas that enters the fluid polymer 12 and enabling generated microbubbles to be evenly distribute in the fluid polymer 12.

Although particular embodiments of the invention has been described in detail for purposes of illustration, various modifications and enhancements may be made without departing from the spirit and scope of the invention. Accordingly, the invention is not to be limited except as by the appended claims.

What is claimed is:

1. A microbubble creating method for creating microbubbles in a polymer using a forming machine, said forming machine comprising a feed screw and a microbubble generator, said microbubble generator comprising a locating ring, a microbubble generating member, a holder member, and a static mixer, said locating ring being mounted at a front end of said feed screw, said microbubble generating member being mounted at said locating ring, said microbubble generating member comprising a perforated tip protruded over a surface of said feed screw, said holder member comprising a runner disposed in communication between said feed screw and a mold, said static mixer mounted in front of said runner of said holder member and away from said front end of said feed screw, the microbubble creating method comprising the steps of:
   a) driving said feed screw to propel a fluid polymer, enabling said perforated tip of said microbubble generating member to be immersed in the fluid polymer and be surrounded by said fluid polymer;
   b) starting up said microbubble generator to fill a gas into an air passage in said feed screw, enabling said gas to be heated when flowing through said air passage; and
   c) enabling the heated said gas to flow from said air passage of said feed screw into, said microbubble generating member for creating microbubbles after passed through said perforated tip of said microbubble generating member so that the created said microbubbles are mixed with said fluid polymer subject to rotation of said feed screw, and the created said microbubbles are mixed with said fluid polymer subject of said static mixer again, and said fluid polymer passed through by said runner of said holder member into said mold.

2. The microbubble creating method as claimed in claim 1, wherein said feed screw comprises a stop flange located at the front end thereof and abutted against said locating ring; said forming machine comprises a check ring axially movably mounted around the front end of said feed screw, said check ring being stopped at said stop flange during filling of said fluid polymer into a mold for molding, said check ring being moved away from said stop flange during intake of said fluid polymer.

3. The microbubble creating method as claimed in claim 1, wherein said microbubble generator further comprises a pressure cylinder, an accumulator connected to said pressure cylinder and an electric heating component attached to said accumulator; said microbubble generating member is connected to said accumulator.

4. The microbubble creating method as claimed in claim 3, wherein said static mixer mounted in said runner of said holder member between said microbubble generating member and said mold.

5. The microbubble creating method as claimed in claim 4, wherein said feed screw comprises a stop flange located at the front end thereof and abutted against said locating ring; said forming machine comprises a check ring axially movably mounted around the front end of said feed screw, said check ring being stopped at said stop flange during filling of said fluid polymer into a mold for molding, said check ring being moved away from said stop flange during intake of said fluid polymer.

6. The microbubble creating method as claimed in claim 3, wherein said feed screw comprises a stop flange located at the front end thereof and abutted against said locating ring; said forming machine comprises a check ring axially movably mounted around the front end of said feed screw, said check ring being stopped at said stop flange during filling of said fluid polymer into a mold for molding, said check ring being moved away from said stop flange during intake of said fluid polymer.

* * * * *